Figure 1:
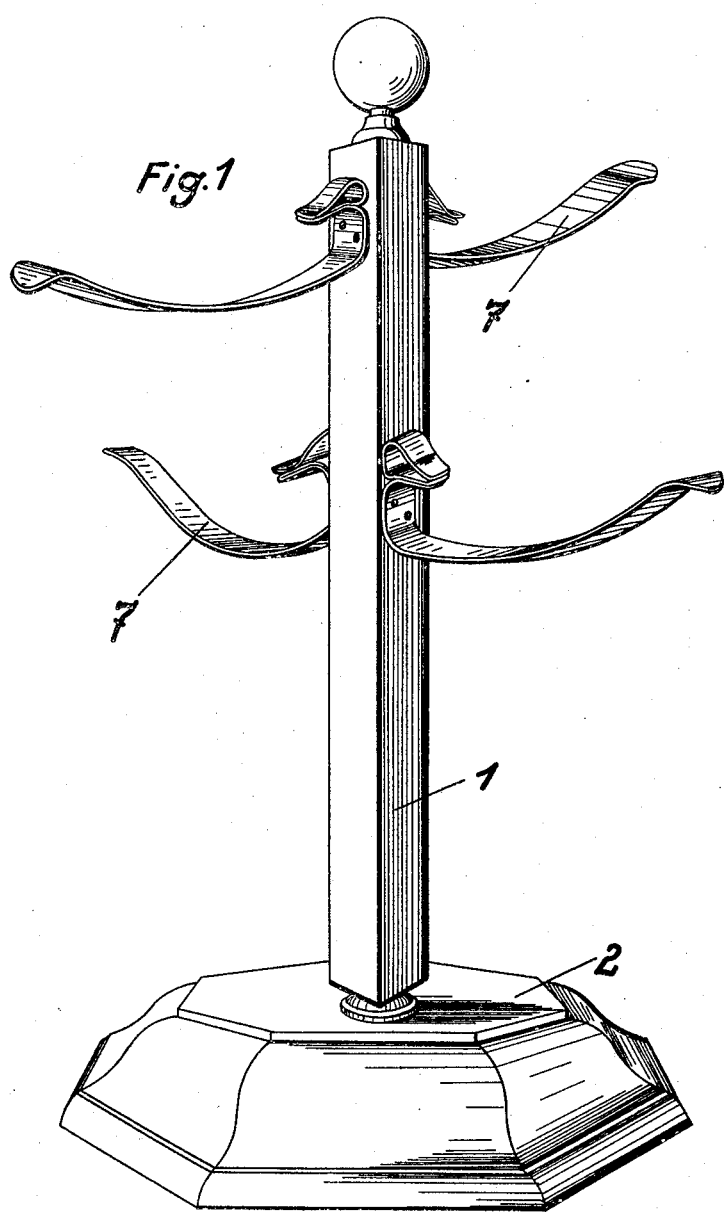

April 18, 1933.   A. GERHOLD   1,904,725
STAND FOR PLATES AND THE LIKE
Filed Sept. 17, 1930   2 Sheets-Sheet 1

Inventor:
A. GERHOLD

April 18, 1933. A. GERHOLD 1,904,725
STAND FOR PLATES AND THE LIKE
Filed Sept. 17, 1930 2 Sheets-Sheet 2
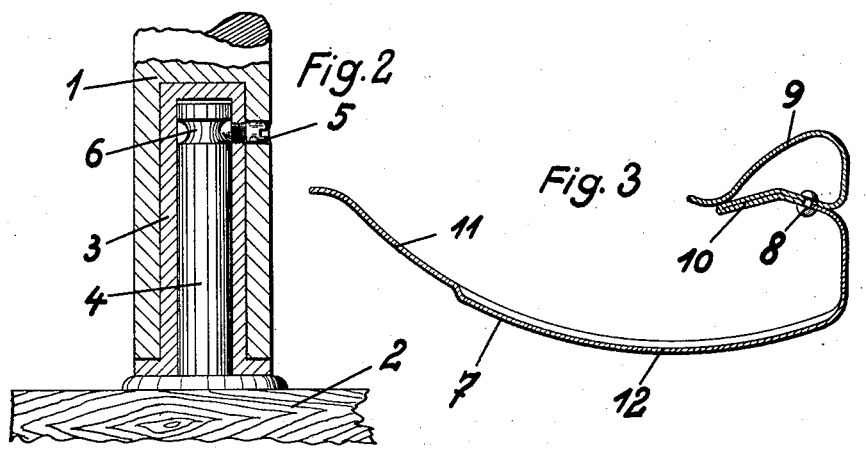
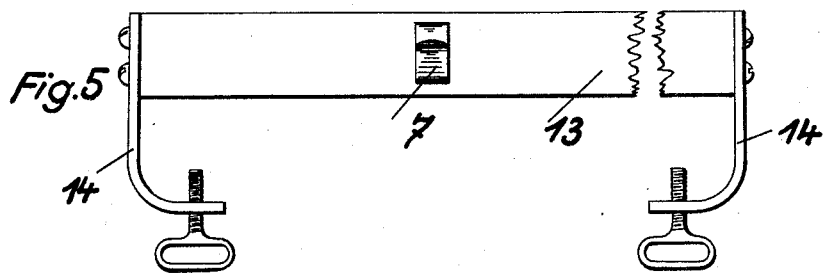
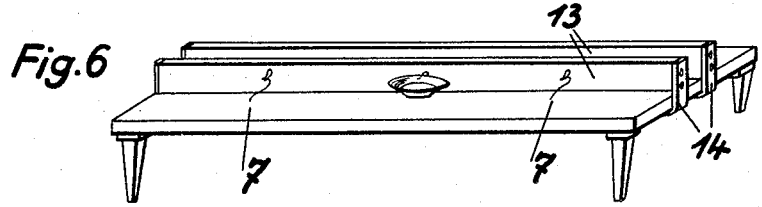
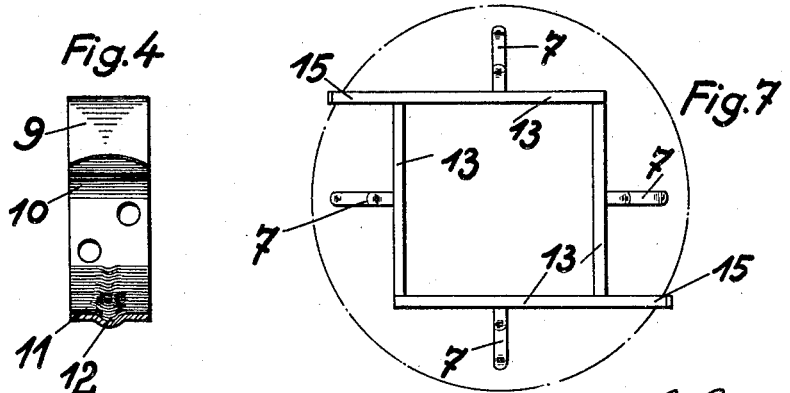
Inventor:
A. GERHOLD Patented Apr. 18, 1933

1,904,725

UNITED STATES PATENT OFFICE

ALFRED GERHOLD, OF LONDON, ENGLAND

STAND FOR PLATES AND THE LIKE

Application filed September 17, 1930, Serial No. 482,595, and in Great Britain October 17, 1929.

This invention relates to stands for plates and the like and has for its object to provide an improved, simple and effective construction of stand whereby a large number of plates, trays or the like with food or articles thereon may be held for the purposes of display or storage in a comparatively small space.

The invention is especially applicable for use in restaurants or the like for holding plates ready to serve to customers, and also in connection with shops, such as jewellers or the like, for holding trays of articles for display purposes.

According to the invention, the improved stand comprises a vertical support fitted with a plurality of spring clips arranged at suitable levels, such clips being adapted to engage over the rim or marginal portion of the plates or the like inserted into the clips to hold the same fixedly substantially at right angles to the support, and being adapted to be fixed to the support so that they are positively held from rotation about their horizontal axes. The vertical support may comprise a pillar of square or other suitable shape in cross-section having the clips arranged in any desired manner on any or all sides thereof. Alternatively, the support may be in the form of a strip or like member adapted to be fixed to a wall or to an existing pillar or the like. The support may consist of two or more sections adapted to be fixed one on top of the other to enable the height of the stand to be varied according to requirements, and such sections may, if desired, be rotatable with respect to one another. Conveniently, the clips comprise a strip of spring metal, preferably steel, bent upon itself to form a substantially U-shaped clip and, in order to prevent the clip from rotating about the horizontal axis, it may be formed with an integral projection adapted to be driven into the support, if of wood, or to engage with a suitable recess therein, the clip being fixed by means of a single centrally arranged screw. In an alternative construction, the clip may be so formed that it may be fixed to the support by means of two screws for the purpose of preventing rotation thereof, while in a further modification the clip may be formed in two parts adapted to be immovably fixed to the support and permitting the clip to be set or adjusted for use with plates or with articles of greater depth. The portions of the clip which come into contact with the plate or the like may be covered with rubber sheathing or other suitable material.

The invention is hereinafter described by way of example with reference to the accompanying drawings, in which:—

Fig. 1 is a perspective view illustrating one construction of the stand on form of invention, Fig. 2 a section through the lower part of the stand, Figs. 3 and 4 show the clips in about natural size, Fig. 5 shows a bar with a clip and with means for affixing the bar on a table plate, Fig. 6 refers to the same mode of execution as Fig. 5 with the difference that two bars are affixed on a table, and Fig. 7 shows a frame provided with clips for holding the frame on the table plate.

The vertical pillar 1 (Fig. 1) is carried turnable in a groundplate 2. As seen by Fig. 2, the lower part of the pillar 1, if from wood, is bored out and is provided with a metallic bearing tube 3 rotating loosely on a pin 4 fixed on the groundplate 2, for preventing a disconnection between the pillar 1 and the pin 4. The latter is provided with a groove 6 into which screw 5 is entered, by withdrawing the screw the pillar can be easily taken off the pin 4.

The connection of the spring clip 7 with the pillar 1 is obtained by means of screws or rivets in such a way that the clips are prevented from turning. The clip 7 consists either in a single metal strip as shown in Figs. 3 and 4 which may be bent back upon itself and held by rivets 8 or which may be made from two strips which may be riveted together.

An upper part of the clip has a spring limb 9 and a strengthening lower part 10. This part 10 is so formed that it is slanting forwardly so that the rim of the plate is held against this part 10 by the pressing action of part 9 which is also somewhat directed downwardly. The lower part of the plate is separated by the spring arm 11 and the rim of the plate is held between the limbs 9 and 10. The arm 11 is provided with a strengthening rib 12 which is pressed out of the sheet metal. By means of such clips, plates, trays, etc., may be introduced easily into the clips and cannot come out by shocks or the like.

The clip 7 may be fixed as shown in Figs. 5 and 6 on a horizontal bar 13. At the side of these bars 13 fixing means 14 are provided so that these bars with the spring clip 7 may be easily affixed on a table plate, for instance on ships.

Fig. 7 shows a somewhat different mode of application in connection with the round table. The bars 17 are here combined to a frame with prolongated arms 15. The clips 7 are arranged in such a way that the persons may sit as usually one opposite the other.

Such a frame may be easily also used for square or other formed tables.

If no fixing means 14 are used the bars 13 with the spring clips 7 lay one on the other in similar way as in the stand according to Fig. 1.

I claim:—

1. A plate holder comprising an arm to form a support having its inner end bent upwardly and outwardly then rebent inwardly, upwardly and downwardly in contact with the rebent portion to form therewith a clamp.

2. A plate holder comprising an arm to form a support, the inner end of the arm being bent upwardly and outwardly and a clamp above and on the outwardly bent portion of the inner end of the arm, said clamp comprising upper and lower resilient clamping members to hold the edge portion of a plate supported on the arm.

3. A plate holder comprising an arm to form a support having its inner end bent upwardly and outwardly, then rebent inwardly, upwardly and downwardly in contact with the rebent portion to form therewith a clamp, the outer end of the arm and the clip being in substantially the same plane to support a plate in a level position.

4. Means for holding plates and the like comprising a clip having upper and lower resilient clamping members serving to engage and hold the edge portion of a plate, and a resilient arm integral with said clip and extending beneath and beyond the same to support the bottom of the plate.

In testimony whereof I affix my signature.

ALFRED GERHOLD.